No. 735,233. PATENTED AUG. 4, 1903.
A. J. FOGG.
PAIL FORMING MACHINE.
APPLICATION FILED DEC. 6, 1901.
NO MODEL. 2 SHEETS—SHEET 1.
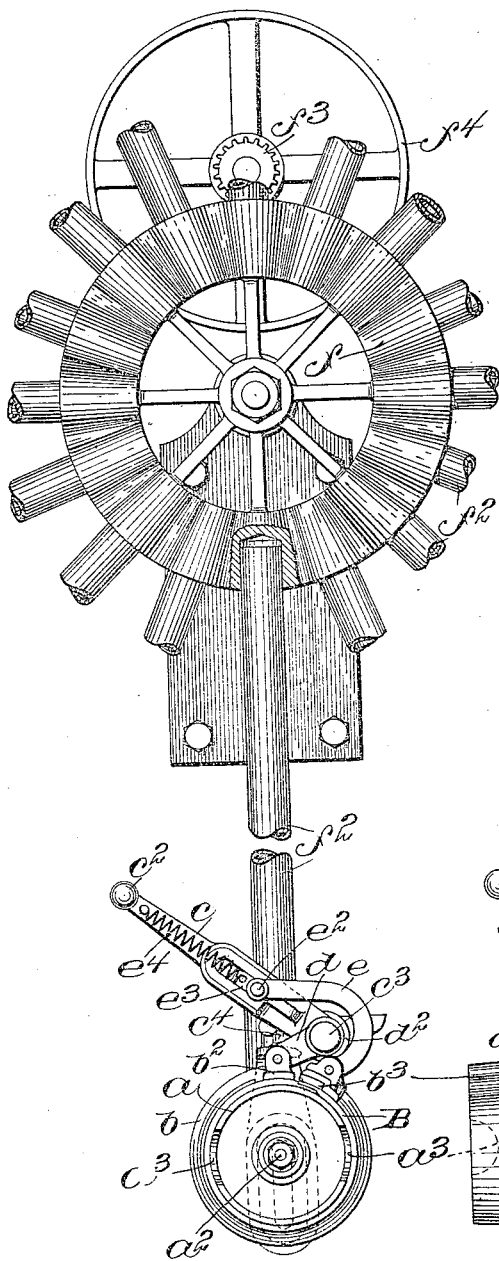
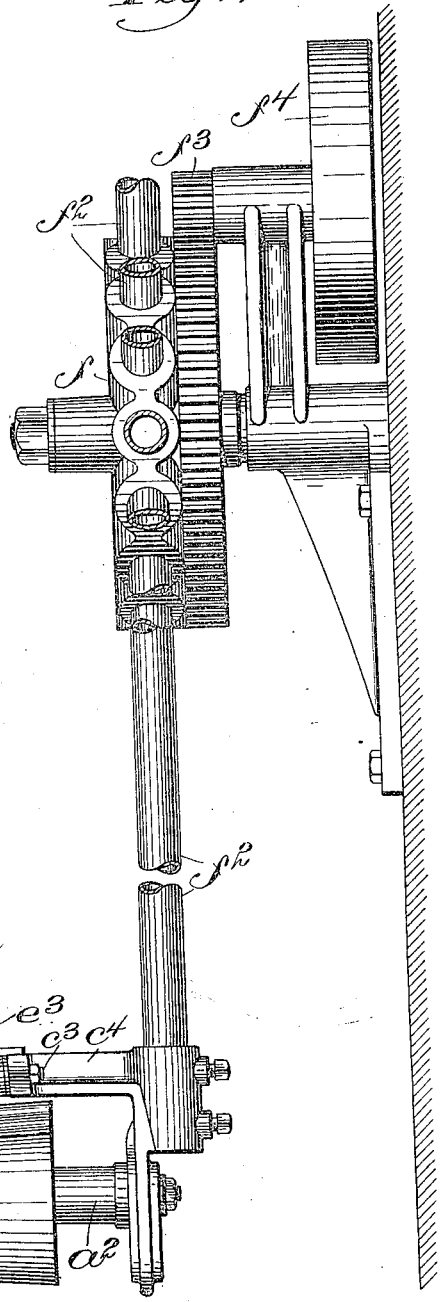

No. 735,233. PATENTED AUG. 4, 1903.
A. J. FOGG.
PAIL FORMING MACHINE.
APPLICATION FILED DEC. 6, 1901.
NO MODEL. 2 SHEETS—SHEET 2.
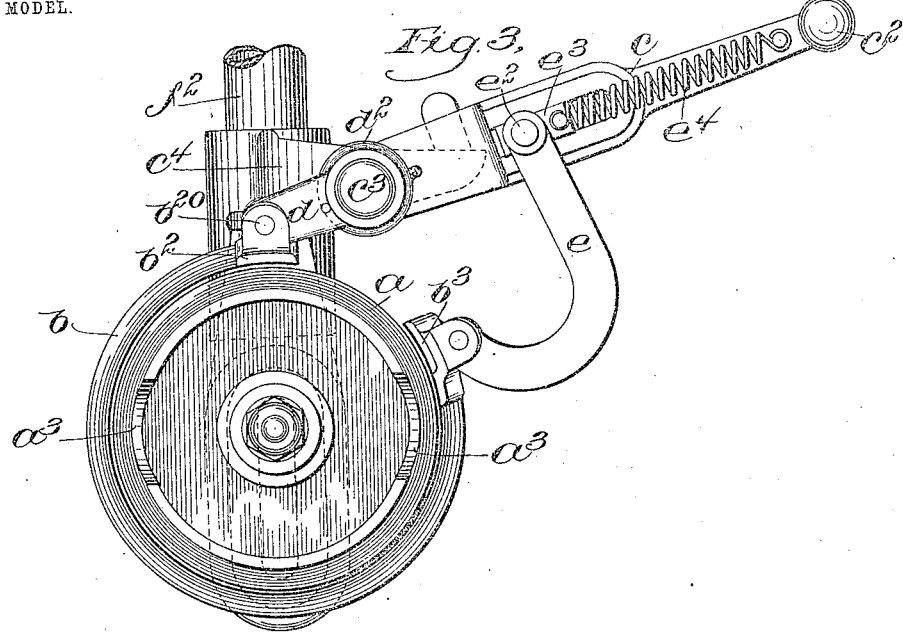
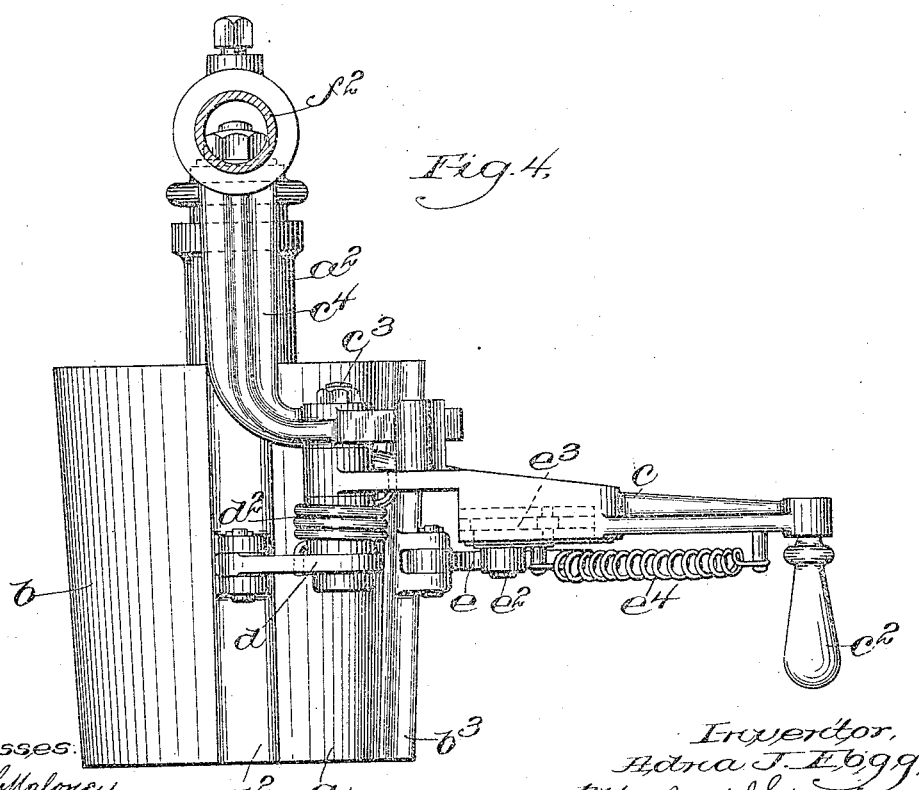

No. 735,233.       Patented August 4, 1903.

UNITED STATES PATENT OFFICE.

ADNA J. FOGG, OF BOSTON, MASSACHUSETTS.

PAIL-FORMING MACHINE.

SPECIFICATION forming part of Letters Patent No. 735,233, dated August 4, 1903.

Application filed December 6, 1901. Serial No. 84,905. (No model.)

*To all whom it may concern:*

Be it known that I, ADNA J. FOGG, of Boston, county of Suffolk, and State of Massachusetts, have invented an Improvement in Pail-Forming Machines, of which the following description, in connection with the accompanying drawings, is a specification, like letters on the drawings representing like parts.

The present invention relates to a machine for forming pail-bodies and is adapted to be used in the manufacture of pails, boxes, or analogous articles in which the body portion is shaped upon a former and the heads of the blank from which the body is formed secured together by adhesive material.

It is the object of the invention to facilitate the process of forming the bodies by providing the former, upon which the body is shaped, with combined wiping and clamping mechanism which draws the body into the proper shape and clamps it, holding the edges together until the adhesive material has set or hardened.

The machine embodying the invention may advantageously be supplied with a plurality of formers, which are mounted on a traveling frame, the size and rate of travel of the frame being such that the time elapsing between the insertion of one of the bodies and its removal to be replaced by another is sufficient to permit the adhesive material to set. As herein shown, the said traveling frame consists in a rotatable spider having a number of radial members, each provided with a former, so that the several members consecutively come into a position to receive the pail-body, the previously-formed body being removed and a new blank applied.

The wiping and clamping mechanism is arranged to be operated by a suitable actuating device under the control of the attendant, the said actuating device being first operated to release the previously-formed pail-body and then actuated to wipe up and clamp the new blank.

Figure 1 is a front elevation of a portion of the machine embodying the invention, the said view showing a part of the spider and one of the formers with its wiping and clamping mechanism; Fig. 2, a side elevation of Fig. 1; Fig. 3, a front view, on a larger scale, of one of the formers with the wiping and clamping mechanism open to receive the body-blank; and Fig. 4, a plan view of the same.

The former $a$ is shown as conical in shape for the formation of the bodies of pails and is surrounded by a clamping and wiping band $b$, the ends of which are arranged to be drawn together around the said former $a$ after a blank B, which is to form the body of the pail, has been placed upon the said former.

In the operation of the machine each blank, one edge of which has been supplied with adhesive material, is inserted endwise between the former $a$ and the band $b$, and the said band is provided with two clamping members $b^2$ and $b^3$, the clamping member $b^2$ being arranged to move in response to the first movement of the actuating device radially toward the former $a$, while the member $b^3$, which is at the other end of the band, is moved circumferentially at first and then radially, so as to draw one end of the blank toward the other and then clamp the same upon the other. The blank is inserted so that the part which has received the adhesive substance lies beyond the clamping member $b^2$, the other end being drawn up by the action of the band until it overlies the adhesive substance, after which it is clamped thereon by the member $b^3$, as best shown in Fig 1.

The actuating device $c$ is shown as a lever provided at the end with a handle $c^2$, the said lever being pivotally supported upon a stud $c^3$, suitably secured to an arm $c^4$, which is so positioned with relation to the arm $a^2$, which supports the former $a$, as to bring the connections with the band $b$ into proper position with relation to said former. In order to obtain the desired movements of the band $b$ and the clamping members $b^2$ $b^3$ the actuator $c$, which has operative connections with both ends of the band, is provided with separate connecting members $d$ and $e$, the member $d$ being shown as a lever pivoted coaxially with the actuator $c$ and also having a pivotal connection at $b^{30}$ with the member $b^2$, the said member $d$ being connected with the hub of the actuator $c$ by means of a spring $d^2$, through which the movement of the actuator is imparted to the lever $d$. In the first movement of the actuating-lever $c$ toward the left from the position shown in Fig. 3 the clamping member $b^2$ through the action of the spring connection is immediately forced into contact with the blank, near the edge thereof, so as to hold the said blank at one end firmly against the surface of the former, the spring $d^2$ permitting the further movement of the actuating-lever $c$ to complete the operation. In such further movement the member $e$, which is shown as a link pivotally connected with the clamping member $b^3$, is given a considerable movement, and the said link $e$ is so arranged that the first part of its movement draws the end of the band $b$ which is provided with the clamping member $b^3$ toward the clamping member $b^2$, the band $b$ thus having a longitudinal movement with relation to the former $a$ and drawing or wiping the blank into position upon the said former until the end thereof overlaps the other end, which is held in position by the member $b^2$.

The link $e$ is so connected with relation to the actuator $c$ and the member $b^3$ that when the said actuator has been moved to its extreme position (shown in Fig. 1) it will impart a radial movement to the member $b^3$, forcing the same toward the body of the former $a$ and clamping the end of the blank which is under the same over the opposite end of the blank held in position by the member $b^2$. In this final movement of the actuator $c$ the point $e^2$, where the link $e$ is connected with the actuating-lever $c$, is arranged to travel past the center of oscillation of the lever $c$, the tendency being, therefore, to hold the member $b^3$ in its clamping position.

In order to provide for the movements described, the link $e$ is provided with a yielding pivotal connection with the actuator $c$, the said link being shown as directly pivoted at $e^2$ upon the sliding block $e^3$, yieldingly connected as by a spring $e^4$ with a part of the lever $c$, so that a radial movement of the pivotal connection $e^2$ with relation to the center of oscillation of the lever $c$ is provided for.

In order to facilitate the operation of forming the pail-bodies, the machine, as shown, can be provided with a number of formers, each having the wiping and clamping mechanism above described, and the said formers mounted on a traveling frame which may advantageously be in the form of a spider, having a hub portion $f$ and spokes or radial members $f^2$, each of which has secured thereon a former and mechanism, as shown in Figs. 1 and 2. The said frame may be suitably driven, as by a spur-gear $f^3$ on a shaft having a driving-pulley $f^4$, the speed of rotation being such as to give the operator time to withdraw the formed pail-body as a former passes by and substitute therefor a body-blank, moving the actuating-lever after the insertion thereof to wipe up and clamp the said blank.

The machine is provided with a sufficient number of formers to give each blank time to dry and set between the time it leaves the point where it is applied and the time it gets back, so that when removed the pail-body is practically finished.

To facilitate the removal of the pail-body, the former $a$, which is shown as a metallic shell, is provided with openings or recesses $a^3$ at its opposite edges to give the operator an opportunity to grasp both sides of the pail-body and pull the same off.

I claim—

1. The combination with a former for the body-blank of a pail; of a wiping-band surrounding the said former and provided at its opposite ends with clamping members; and means for moving one of the said clamping members radially toward the former and the other clamping member circumferentially and then radially, substantially as and for the purpose described.

2. The combination with the former; of a wiping and clamping band encircling said former; clamping members at opposite ends of said band; a lever pivotally connected with one of said clamping members; an actuating-lever having a spring connection with said lever to move the same toward the former; and a link connecting said actuating member with the other clamping member whereby the continued movement of said actuating member moves the said clamping member first circumferentially and then radially with relation to the former, as set forth.

3. The combination with a former and a wiping-band provided at opposite ends with clamping members; of a pivotally-supported actuating-lever; a connecting-lever pivoted coaxially with said actuating-lever and also connected with one of said clamping members; a spring connecting said levers; and a link connected with the other clamping member and having a yielding pivotal connection with the actuating member, substantially as described.

4. In a machine for forming pail-bodies, the combination with a plurality of sets of formers, each provided with wiping and automatically-clamping mechanism; of a traveling frame for the said formers whereby each former is presented at certain intervals of time for the removal of a finished body and the insertion of a new blank and driving mechanism for said frame; as set forth.

In testimony whereof I have signed my name to this specification in the presence of two subscribing witnesses.

ADNA J. FOGG.

Witnesses:
HENRY J. LIVERMORE,
JAS. J. MALONEY.